(12) United States Patent
Gerard et al.

(10) Patent No.: US 9,637,637 B2
(45) Date of Patent: May 2, 2017

(54) SURFACE MODIFIED CALCIUM CARBONATE CONTAINING MINERALS AND ITS USE

(71) Applicant: Omya International AG, Oftringen (CH)

(72) Inventors: Daniel Edward Gerard, Basel (CH); Joachim Schoelkopf, Oberkulm (CH); Patrick Arthur Charles Gane, Rothrist (CH); Fritz Lehner, Zofingen (CH); Dennis Werner, Olten (CH)

(73) Assignee: Omya International AG, Oftringen (CH)

( * ) Notice: Subject to any disclaimer, the term of this patent is extended or adjusted under 35 U.S.C. 154(b) by 0 days.

(21) Appl. No.: 15/272,771

(22) Filed: Sep. 22, 2016

(65) Prior Publication Data

US 2017/0009077 A1    Jan. 12, 2017

Related U.S. Application Data

(62) Division of application No. 14/408,630, filed as application No. PCT/EP2013/064548 on Jul. 10, 2013.

(60) Provisional application No. 61/673,797, filed on Jul. 20, 2012.

(30) Foreign Application Priority Data

Jul. 13, 2012 (EP) ..................................... 12176320

(51) Int. Cl.
| | | |
|---|---|---|
| *C01F 11/18* | (2006.01) | |
| *C09C 1/02* | (2006.01) | |
| *D21H 17/67* | (2006.01) | |
| *D21H 19/38* | (2006.01) | |
| *D21H 21/52* | (2006.01) | |
| *C09D 7/12* | (2006.01) | |
| *D21H 17/69* | (2006.01) | |

(52) U.S. Cl.
CPC ............ *C09C 1/022* (2013.01); *C01F 11/185* (2013.01); *C09D 7/1225* (2013.01); *D21H 17/675* (2013.01); *D21H 19/385* (2013.01); *D21H 21/52* (2013.01); *C01P 2004/32* (2013.01); *C01P 2004/51* (2013.01); *C01P 2004/61* (2013.01); *C01P 2006/12* (2013.01); *C01P 2006/60* (2013.01)

(58) Field of Classification Search
CPC ......... C09C 1/022; C09C 3/08; C09D 7/1225; C01P 2004/51; D21H 17/69; C01F 11/18
See application file for complete search history.

(56) References Cited

U.S. PATENT DOCUMENTS

| | | | |
|---|---|---|---|
| 5,531,821 | A | 7/1996 | Wu |
| 5,584,923 | A | 12/1996 | Wu |
| 5,634,968 | A | 6/1997 | Pfaller et al. |
| 6,666,953 | B1 | 12/2003 | Gane et al. |
| 2006/0162884 | A1 | 7/2006 | Gane et al. |
| 2008/0022901 | A1 | 1/2008 | Buri et al. |

FOREIGN PATENT DOCUMENTS

| | | |
|---|---|---|
| EP | 0179597 A2 | 4/1986 |
| EP | 2264108 A1 | 12/2010 |
| EP | 2264109 A1 | 12/2010 |
| JP | 2003147275 A | 5/2003 |
| WO | WO 2005/102931 | * 11/2005 |
| WO | 2006105189 A1 | 10/2006 |
| WO | 2006109171 A1 | 10/2006 |

OTHER PUBLICATIONS

Office Action dated Feb. 23, 2016 for JP 2015-520968.
Communication dated Feb. 21, 2013 for European Application No. 12176320.5.
International Preliminary Report on Patentability dated Jan. 13, 2015 for PCT/EP2013/064548.
The International Search Report dated Jul. 30, 2013 for PCT/EP2013/064548.
The Written Opinion of the International Searching Authority dated Jul. 30, 2013 for PCT/EP2013/064548.

* cited by examiner

*Primary Examiner* — Pegah Parvini
(74) *Attorney, Agent, or Firm* — Amster, Rothstein & Ebenstein LLP

(57) ABSTRACT

The present invention is related to ball-shaped spherical surface modified spherical calcium carbonate comprising minerals, the process for preparing such ball-shaped spherical surface modified spherical calcium carbonate comprising minerals, and their use.

30 Claims, 5 Drawing Sheets

Figure 1:
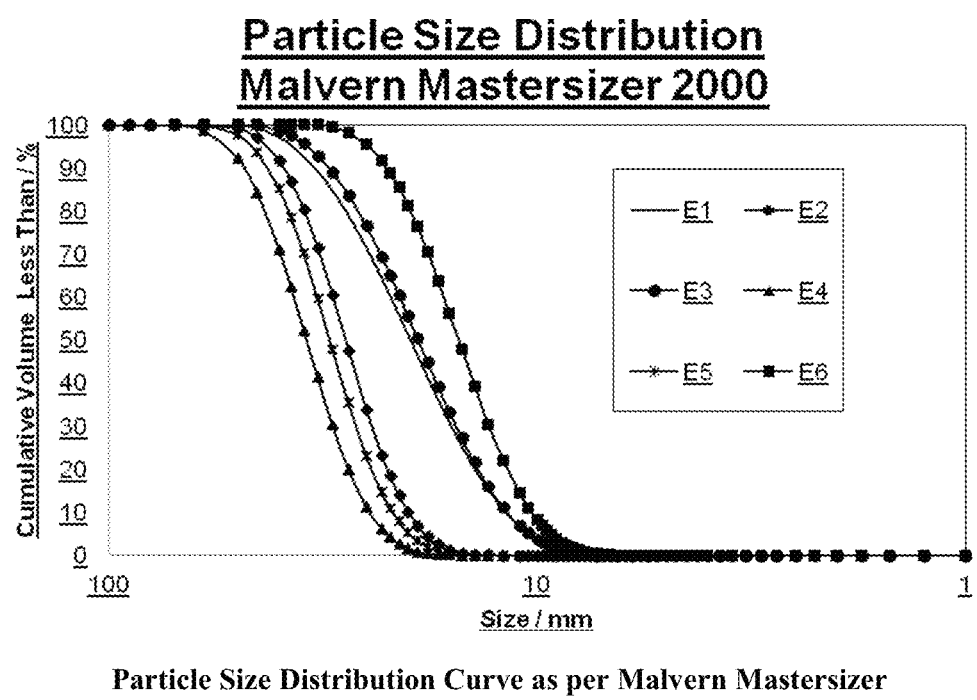

Particle Size Distribution Curve as per Malvern Mastersizer

SEM x500 magnification of example E2. Ball-shaped surface modified $CaCO_3$ comprising minerals.

SEM x2500 magnification of Example E2. Ball-shaped surface modified $CaCO_3$ comprising minerals.

SEM x500 magnification of Example E6. Ball-shaped surface modified $CaCO_3$ comprising minerals.

SEM x2500 magnification of Example E6. Ball-shaped surface modified CaCO$_3$ comprising minerals.

SURFACE MODIFIED CALCIUM CARBONATE CONTAINING MINERALS AND ITS USE

CROSS-REFERENCE TO RELATED APPLICATIONS

This is a divisional of U.S. application Ser. No. 14/408,630, filed Dec. 17, 2014, which is a U.S. National phase of PCT Application No. PCT/EP2013/064548, filed Jul. 10, 2013, which claims priority to European Application No. 12176320.5, filed Jul. 13, 2012 and U.S. Provisional Application No. 61/673,797, filed Jul. 20, 2012, the contents of which are hereby incorporated by reference.

FIELD OF THE INVENTION

The present invention is related to calcium carbonate containing minerals, and in particular to ball-shaped spherical surface modified spherical calcium carbonate comprising mineral particles with a mean particle size diameter above 1 µm, and its use. A particular use is in paints and coatings, providing for a surface matting effect of the paint and coating while at the same time providing for a smooth paint or coating surface.

BACKGROUND OF THE INVENTION

The present invention is directed to modified calcium carbonate containing minerals and their use, e.g., in paints and coatings at low dosage, and more particularly to a modified calcium carbonate containing mineral providing a matting effect in paints and coatings, while at the same time providing a smooth paint or coating film.

Today matting effects can be achieved by different means as long as they provide for a micro-roughness of the paint or coating film surface, wherein the incident light is scattered in a way that results in matted surface. The physics behind this is known. The conditions to obtain a perfectly matted effect without resorting to complete light absorption are to scatter the incoming light away from the specular reflectance angle. This means diffracting the directed light that illuminates the substrate causing diffuse scatter.

In paint and coating industries a variety of such matting agents are known and mixed into the paints and coatings such as silica, waxes, organic materials and even fillers are added to form a micro-rough surface after the drying process of the paint or coating. It is recognized as a general rule that the higher the dosing of the matting agent in a paint or coating, the stronger the matting effect. In contrast, products with larger particle sizes are stronger in matting efficiency but the resulting paint or coating film surface is not so smooth. Matting agents with smaller average particle size distribution do not provide sufficient matting effect, but provide for a smoother paint or coating surface.

Japanese patent application JP-A-2003 147275 discloses a coating material composition comprising a binder component and a calcium carbonate treated with phosphoric acid. Said coating material provides for a matte surface providing that the treated calcium carbonate has a mean particle diameter of less than 10 µm, a BET specific surface area of 70-100 $m^2/g$ and oil absorption of 130-20 ml/100 g.

WO 2006/105189 A1 refers to aggregated particulate minerals and compositions comprising aggregated calcium carbonate. Said dry aggregated calcium carbonate beads have a weight median aggregate particle size $d_{50}$ of at least 5 µm and even a size of at least 100 µm. Said aggregated calcium carbonate beads are made into paper, paint, coatings or ceramics.

U.S. Pat. No. 5,634,968 refers to carbonate containing mineral fillers, more particularly for use as matting agents. Said mineral materials are natural and/or precipitated calcium carbonates with a $d_{50}$ of 9.6-20.5 µm, wherein ground natural calcium carbonates are preferred.

U.S. Pat. Nos. 5,531,821 and 5,584,923 disclose and claim acid resistant calcium carbonates made by mixing calcium carbonate with anionic salts and cationic salts. Said acid resistant calcium carbonate is being used in neutral to weakly acid paper making processes.

U.S. Pat. No. 6,666,953 disclose a pigment of filler containing natural carbonate which is treated with one or more providers of medium-strong to strong $H_3O^+$ ions and gaseous $CO_2$.

U.S. 2008/0022901 refers to mineral pigments containing a dry product formed in situ by the multiple reaction between a calcium carbonate and the product or products of reaction of said carbonate with one or more moderately strong to strong $H_3O^+$ ion donators and the product or products of reaction of the said calcium carbonate with gaseous $CO_2$ formed in situ and/or originating from an external supply and one or more compounds of formula R-X.

EP 2 264 109 A1 and EP 2 264 108 A1 disclose a process for preparing a surface-reacted calcium carbonate and its use as well as a process to prepare a surface-reacted calcium carbonate implementing the a weak acid, resulting products and uses thereof.

DESCRIPTION OF THE INVENTION

The present invention relates to a surface modified calcium carbonate comprising mineral of spherical shape and its use. Particularly they are used in paints or coatings, providing for a matting effect and a smooth paint or coating surface at low dosage. Surface modified calcium carbonate comprising mineral can be obtained by processes as described in the prior art.

The process for producing the spherical shaped surface modified calcium carbonate comprising particles basically comprises the steps of:
  a) providing at least one aqueous calcium carbonate containing mineral slurry;
  b) providing at least one water-soluble acid;
  c) optionally providing further gaseous $CO_2$ via an external route;
  d) contacting said aqueous calcium carbonate containing mineral slurry of step a) with said acid of step b) and with said $CO_2$ generated in situ and/or supplied externally of step c) under stirring conditions.
  e) optionally dewatering the aqueous slurry;

The spherical ball-shaped surface modified calcium carbonate containing mineral obtained by such a process has specific BET surface area of more than 15 $m^2/g$, and preferably from about 20 $m^2/g$ to about 200 $m^2/g$, more preferably from about 30 $m^2/g$ to about 150 $m^2/g$, even more preferably from about 40 $m^2/g$ to about 100 $m^2/g$, and a median grain diameter of from about from 4 µm to about 100 µm, preferably from about 5 µm to about 75 µm, more preferably from about 1 µm to about 50 µm, still more preferably from about 15 µm to about 30 µm.

Within the context of the present invention, spherical shaped means that the appearance of the spherical shaped surface modified calcium carbonate containing mineral is globular or ball-shaped.

Further, the ball-shaped surface modified calcium carbonate comprising mineral has a narrow particle size distribution $d_{98}/d_{50}$ preferably smaller than 3, more preferably smaller than 2.5, preferably in a range from 1.4 to 2.9.

These specific properties are particularly obtained when the at least one aqueous calcium carbonate containing mineral slurry has a solids content of greater than 4 wt. %, preferably from 5 wt. % to about 20 wt. %, more preferably from about 7 wt. % to about 10 wt. %, based on the weight of the slurry. Lower solids content such as below 4 wt. % or higher solids content such as above 20 wt. % could be used as well.

It is preferred that the calcium carbonate containing mineral is selected from the group consisting of marble, chalk, limestone, calcite, dolomite and precipitated calcium carbonate (PCC), and mixtures thereof. PCC is sometime also referred to as synthetic calcium carbonate. Said calcium carbonate containing mineral are basically supplied in an aqueous system. Said aqueous system frequently being a slurry.

A "slurry" in the meaning of the present invention is a suspension (comprising essentially insoluble solids and water and optionally further additives) and usually has a higher density than the liquid without solids from which it is formed.

In accordance with the present invention the calcium carbonate containing mineral comprises generally either ground marble, chalk, limestone, calcite, dolomite or mixtures thereof, but encompasses also precipitated calcium carbonate (PCC), which is also known as synthetic calcium carbonate as starting material.

Advantageously, the calcium carbonate containing mineral present in the slurry has a weight median particle diameter of 0.01 μm to 10 μm, preferably from 0.2 μm to 2 μm, more preferably from 0.5 μm to 1 μm, as measured by Sedigraph.

The slurry in the process of the present invention can be stabilized or not. In case the slurry is stabilized, conventional dispersants known to the skilled person can be used. A preferred dispersant is polyacrylic acid, or other partially or fully neutralized forms like sodium polyacrylate.

The at least one water-soluble acid provided in step b) can be chosen from acids as disclosed in EP 2 264 109 A1 and/or EP 2 264 108 A1. An example of such acid is phosphoric acid or sulfuric acid.

The at least one water-soluble acid provided in step b) is dosed in a molar amount relative to the numbers of moles of the calcium carbonate containing mineral in the range from 0.01 mol/mol to about 1 mol/mol. Preferably from 0.1 to 0.6 mol/mol.

The at least one water-soluble acid provided in step b) is added in one or more steps, preferably in one step to said aqueous calcium carbonate containing mineral slurry.

The addition in one or more steps can also be executed over a defined time period, such as a time period of 5 min, 10 min, 20 min, 30 min, 60 min or longer such as 120 min or 180 min. When the addition is made over a certain time period, the addition can be made continuously or discontinuously. E.g. adding 30% dose over 10 minutes would therefore be 3% dose per minute.

Optionally, after the addition of at least one water-soluble acid in step b) gaseous $CO_2$ can be provided into the slurry by an external route. Such addition of gaseous $CO_2$ is known to the skilled person. However $CO_2$ can be generated also in situ when the carbonate containing mineral is reacting with the $H_3O+$ ions. Therefore the origin of $CO_2$ can be either in situ or supplied externally or even a combination thereof.

Irrespective of the optional addition of gaseous $CO_2$ to the slurry, the process of the present invention further comprises the step e) which is contacting said aqueous calcium carbonate containing mineral slurry of step a) with said acid of step b) and with said in situ generated and/or externally supplied $CO_2$ of step d), said contacting being made under stirring or mixing conditions.

The process may further comprise step c) wherein a processing agent is provided before, during or after the at least one aqueous calcium carbonate containing mineral slurry of step a) is contacted with said at least one water-soluble acid of step b) and with said in situ generated or externally supplied $CO_2$ or a combination thereof of step d).

Preferably the processing agent is provided before and/or during the at least one aqueous calcium carbonate containing mineral slurry of step a) is contacted with said at least one water-soluble acid of step b) and with said in situ generated or externally supplied $CO_2$ or a combination thereof of step d).

Thus, in a particular embodiment of the process as herein disclosed, the processing agent is added before the addition of the water-soluble acid of step b), followed by the steps c), d), and e)

In a further particular embodiment of the process as herein disclosed, the processing agent is added during the addition of the water-soluble acid of step b), followed by the steps c), d), and e). And still in another embodiment of the process as herein disclosed, the processing agent is added after the addition of the water-soluble acid of step b), followed by the steps c), d), and e).

Preferably, the processing agent is added before and/or during the addition of the water-soluble acid of step b), followed by the steps c), d), and e).

Said at least one processing agent may be preferably selected from the group comprising ferrous sulfate, ferric sulfate, ferrous chloride, ferric chloride, aluminum sulfate, and/or their hydrated forms, silicates, water-soluble cationic polymers, water-soluble amphoteric polymers, water-soluble non-ionic polymers and combinations thereof, as well as seeds of precipitated calcium carbonate (PCC), surface reacted calcium carbonate of the prior art or ball-shaped surface reacted calcium carbonate comprising mineral obtained by the process of the present invention.

Without being bound to any theory the inventors believe that the at least one processing agent functions as a coagulating agent promoting the assembly of calcium carbonate containing mineral particles which upon further exposure to the mentioned chemicals in the process provide for the ball-shaped surface modified calcium carbonate containing particles.

The reaction conditions of the process as herein described take place in an aqueous environment in a temperature range above and including 10° C., such as from about 25° C. to about 95° C., preferably in a range from about 30° C. to about 80° C., more preferably from about 50° C. to about 75° C.

The processing agent is dosed in one or more steps, preferably in one step to said aqueous calcium carbonate containing mineral slurry before, during or after the addition of the at least one water-soluble acid of step b). The processing agent is added in amounts of up to 8 wt. % based on the dry weight of the slurry. Preferably the processing agent is added in amounts from 0.01 wt. % to about 5 wt. %, more preferably from about 0.05wt. % to about 4 wt. %, still more preferably from about 0.4 wt % to about 3wt. %, based on the dry weight of the slurry.

In a particular embodiment, the processing agent is aluminum sulfate. In a further particular embodiment, the processing agent is aluminum sulfate in its hydrated form. In preferred embodiment the processing agent is aluminum sulfate hexadecahydrate.

In still a further embodiment, the content of the aluminum sulfate in the process as herein described is up to 4 wt. % based on the weight of the dry slurry, preferably in the range from about 0.1 wt % to about 2 wt. %, more preferably from about 0.2 wt % to about 1 wt %, based on the dry slurry. It has to be considered that the content of aluminum sulfate is crucial thus dosing of the hydrate requires the corresponding adaption to achieve the desired amount.

After mixing the slurry can be dewatered in an optional step e), by any type of thermal and/or mechanical methods known to the skilled person.

The aqueous slurry thus obtained can be further treated such as drying the aqueous slurry in order to obtain a dry surface modified calcium carbonate comprising mineral of spherical or ball-shape. The drying method applied to obtain a dry surface modified calcium carbonate comprising mineral of spherical or ball-shape can be any kind of drying method well known to the skilled person.

The aqueous ball-shaped surface modified calcium carbonate containing mineral comprised in the slurry obtained by the process of the present invention, has a median grain diameter of from 4 µm to about 100 µm, preferably from about 5 µm to about 75 µm, more preferably from about 10 µm to about 50 µm, still more preferably from about 15 µm to about 30 µm.

The aqueous ball-shaped surface modified calcium carbonate containing mineral comprised in the slurry obtained by the process of the present invention, has at the same time a narrow particle size distribution $d_{98}/d_{50}$ preferably smaller than 3, more preferably smaller than 2.5, preferably in a range from 1.4 to 2.9.

Still further the aqueous surface modified calcium carbonate containing mineral comprised in the slurry obtained by the process herein described, has a BET specific surface area of more than 15 $m^2/g$, and preferably from about 20 $m^2/g$ to about 200 $m^2/g$, more preferably from about 30 $m^2/g$ to about 150 $m^2/g$, even more preferably from about 40 $m^2/g$ to about 100 $m^2/g$.

A BET specific surface area within the meaning of the present invention relates to the specific surface area measured via the method provided in the examples section hereafter.

In a preferred embodiment, the aqueous ball-shaped surface modified calcium carbonate containing mineral comprised in the slurry obtained by the process of the present invention, has a BET specific surface area from 30 $m^2/g$ to about 90 $m^2/g$ and a median grain diameter from 10 µm to 50 µm.

According to another embodiment, the aqueous slurry of the ball-shaped surface modified calcium carbonate containing mineral obtained by the process as herein described can be further dried to obtain a dry ball-shaped surface modified calcium carbonate containing mineral.

According to still another embodiment, said dry ball-shaped surface modified calcium carbonate containing mineral, has a BET specific surface area of more than 15 $m^2/g$, and preferably from about 20 $m^2/g$ to about 200 $m^2/g$, more preferably from about 30 $m^2/g$ to about 150 $m^2/g$, even more preferably from about 40 $m^2/g$ to about 100 $m^2/g$. Further said dry ball-shaped surface modified calcium carbonate containing mineral, has a median grain diameter of from 4 µm to about 100 µm, preferably from about 5 µm to about 75 µm, more preferably from about 10 pm to about 50 µm, still more preferably from about 15 µm to about 30 µm.

Figure 2A:
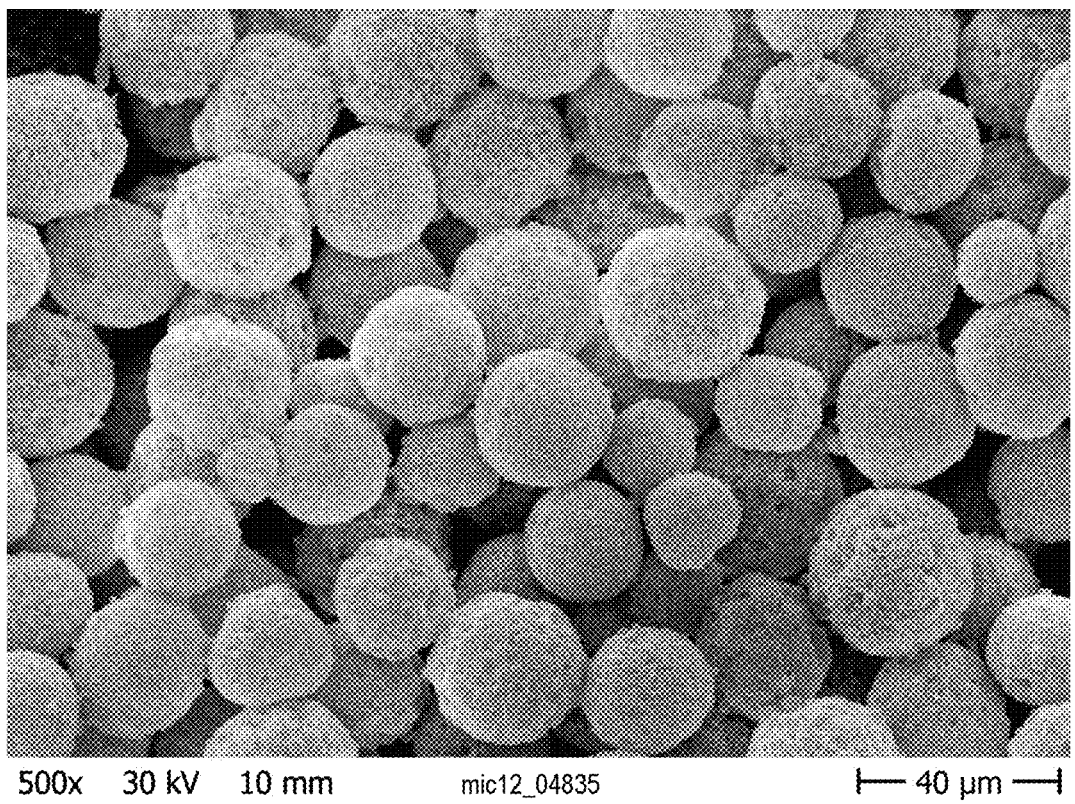

FIG. 1: shows particle size distribution curves of surface modified calcium carbonate containing minerals according to the present invention FIG. 2a: shows an SEM picture of ball-shaped surface modified calcium carbonate containing mineral of E2, at 500× magnification.

Figure 2B:
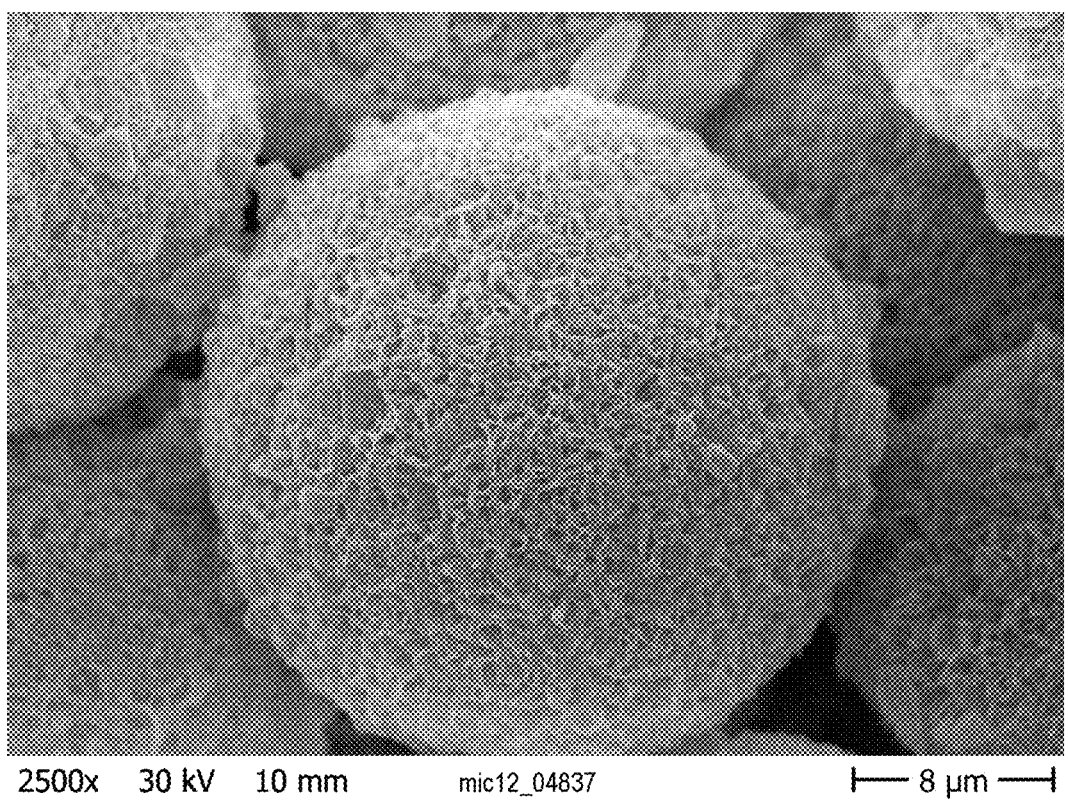

FIG. 2b: shows an SEM picture of ball-shaped surface modified calcium carbonate containing mineral of E2, at 2500× magnification.

Figure 3A:
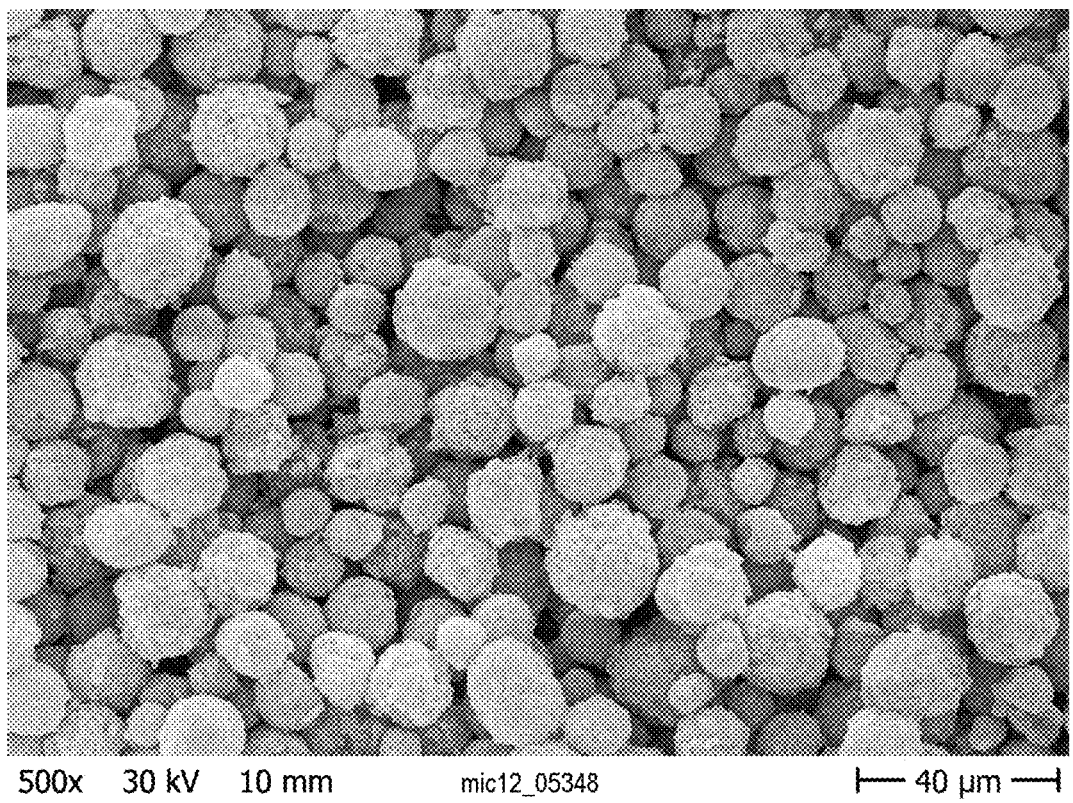

FIG. 3a: shows an SEM picture of ball-shaped surface modified calcium carbonate containing mineral of E6, at 500× magnification.

Figure 3B:
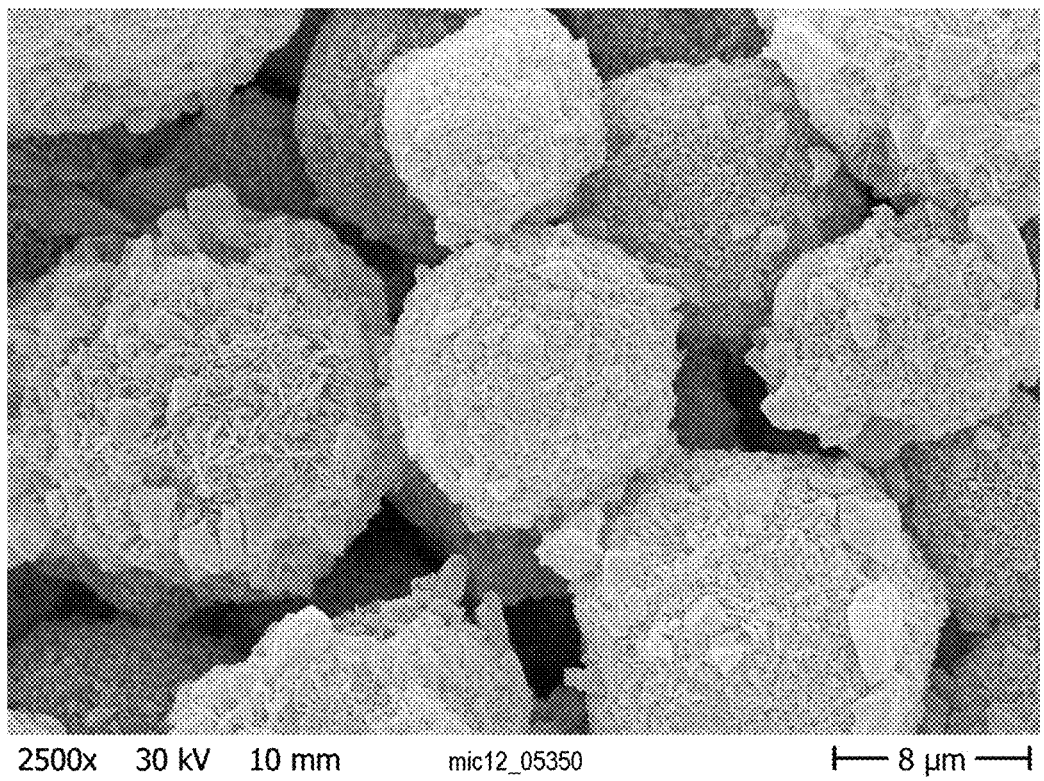

FIG. 3b: shows an SEM picture of ball-shaped surface modified calcium carbonate containing mineral of E6, at 2 500× magnification.

USE OF THE INVENTION

The inventive ball-shaped surface modified calcium carbonate containing mineral or a slurry comprising said inventive ball-shaped surface modified calcium carbonate containing mineral may be used in paper, tissue paper, digital photo paper, paints, coatings, adhesives, plastics, or in waste water treatment or waste water treating agents.

In preferred embodiment, the inventive ball-shaped surface modified calcium carbonate containing mineral is used in paints or coatings as a matting agent. By matting agent, the applicant understands an agent being capable of scattering the incoming light away from the specular reflectance angle. This means diffracting the directed light that illuminates the substrate causing diffuse scatter.

In particular the matting agent is present in amounts of 1 to 10 wt. %, preferably in amounts of 2 to 7 wt. %, more preferably in amount of 3to 5 wt. %, based on the total weight of the paint or coating.

The paints or coatings comprising the inventive ball-shaped surface modified calcium carbonate containing mineral as matting agents in the amounts mentioned above provide for a surface gloss at 85° in the range of below 10 gloss units (GU), preferably from 0.5 to 9.5, more preferably from 1 to 8, still more preferably from 2 to 6.5, of the dried film of the paint or coating, when measured according to DIN 67 530, which is very surprising due to the low content of the matting agent.

A further advantage of the inventive ball-shaped surface modified calcium carbonate containing mineral present in amounts as described above is, that besides the matting effect of the dried film of the paint or coating, the surface of said dried paint or coating is smooth.

Thus, the inventive ball-shaped surface modified calcium carbonate containing mineral of the present invention when used in paints and/or coatings, provide for matt appearance while at the same time providing a haptic smooth surface.

The following examples are meant to illustrate the invention without restricting its scope:

Measurement Methods

The following measurement methods are used to evaluate the parameters given in the description, examples and claims.

BET Specific Surface Area (SSA) of a Material

The specific surface area is measured with nitrogen via the BET method according to ISO 9277 using a Gemini V sold by the company MICROMERITICS™, following conditioning of the sample by heating at 250° C. for a period of 30 minutes. Prior to such measurements, the sample is filtered within a Buchner funnel, rinsed with deionised water and dried overnight at 90° C. to 100° C. in an oven. Subsequently, the dry cake is ground thoroughly in a mortar and the resulting powder placed in a moisture balance at 130° C. until a constant weight is reached.

Solids Content of an Aqueous Slurry

The slurry solids content (also known as "dry weight") is determined using a Moisture Analyser HR73 commercially available from Mettler-Toledo with the following settings: temperature of 120° C., automatic switch off 3, standard drying, 5-20 g of slurry.

Particle Size Distribution (Mass % Particles with a Diameter <x) and Weight Median Diameter (d50) of Non-Surface Reacted Calcium Carbonate Comprising Material (i.e. Calcium Carbonate Starting Material)

Weight median grain diameter and grain diameter mass distribution of a particulate material such as calcium carbonate, are determined via the sedimentation method, i.e. an analysis of sedimentation behavior in a gravimetric field. The measurement is made with a Sedigraph™ 5120.

The method and instrument are known to the skilled person and are commonly used to determine grain size of fillers and pigments. The measurements is carried out in an aqueous solution of 0.1 wt % $Na_4P_2O_7$. The samples were dispersed using a high speed mixer and ultrasound.

Median Grain Diameter $d_{50}$ and $d_{98}$ of Ball-Shaped Surface Modified Calcium Carbonate Containing Mineral Median grain diameter, $d_{50}$ and $d_{98}$, of ball-shaped surface modified calcium carbonate containing mineral was determined using a Malvern Mastersizer 2000 Laser Diffraction System, with a defined RI of 1.57 and iRI of 0.005, Malvern Application Software 5.60. The measurement was performed on an aqueous dispersion. The samples were dispersed using a high-speed stirrer. In this respect, the $d_{50}$ and $d_{98}$ values define the diameters, at which 50 vol. % or 98 vol. % of the particles measured, have a diameter smaller than $d_{50}$ or $d_{98}$ value, respectively.

Viscosity Measurements

A. ICI Viscosity According to EN ISO 2884-1

The ICI viscosity was measured according to EN ISO 2884-1 using a cone-and plate viscometer (Epprecht Instruments+Controls, Bassersdorf, Switzerland) at a shear rate of 10 000 l/s at a temperature of (23±0.2)° C. The measured value after 15 s, which should be a constant value, depicts the measured viscosity of the sample.

B. Viscosity with a Paar Physica M301 PP25 Rheometer

This measurement was conducted with a Paar Physica M301 PP25 Rheometer, from the company Anton Paar GmbH, Austria, according to the following regime:

Temp.: 23° C.
Starting shear rate: 0.1 l/s
End shear rate: 100 l/s, with a logarithmic gradient of 10 measurement points per decade, and each measurement point taken after 5 seconds.
The measurement points are displayed in a decimal logarithmic manner, so that a linear plot with a negative slope results from this measurement. The x-axis of the graph represents the shear rate in a decimal logarithmic manner, and the y-axis depicts the measured viscosity in Pa·s.

Gloss of a Coated Surface

The Gloss values are measured at the listed angles according to DIN 67 530 on painted surfaces prepared with a coater gap of 150 μm and 300 μm on contrast cards. The contrast cards used are Leneta contrast cards, form 3-B-H, size 7-5/8×11-3/8(194×289 mm), sold by the company Leneta, and distributed by Novamart, Stafa, Switzerland. The gloss is measured with a gloss measurement device from the company Byk Gardner, Geretsried, Germany. The gloss is obtained by measuring 5 different points on the card with the gloss measurement device, and the average value is calculated by the device and can be derived from the display of the device.

Scrubbing Test

For the scrubbing test, Laneta contrast cards, form 3-B-H, size 7-5/8×11-3/8(194×289 mm), sold by the company Leneta, and distributed by Novamart, Stafa, Switzerland, coated with a coater gap of 300 μm, as mentioned above were submitted to a scrubbing test. The scrubbing was performed with a square felt-glider 22 mm×22 mm fixed on the scrubbing device. The arm holding the felt-glider was loaded with a 500 g weight pressing the felt-glider onto the surface of the coated Leneta card. The scrubbing path length was 5 cm and 50 cycles (1 clyle=forth and back) where performed within 60 sec±2 sec. The felt-glider was of the fix-o-moll type, provided by from Wilhelm Ritterath GmbH, Meckenheim, Germany. Gloss was measured according to DIN 67 530 at 60° and 85° before and after scrubbing.

Determination of Colour Values (Rx, Ry, Rz)

The colour values Rx, Ry, Rz are determined over the white and black fields of the Leneta contrast card, and are measured with a spectraflas SF 450 X spectrophotomer of the company Datacolor, Montreuil, France.

Contrast Ratio (opacity) of a Coated Surface

Contrast ratio values are determined according to ISO 2814 at a spreading rate of 7.5 m²/l.

The contrast ratio is calculated as described by the equation below:

$$\text{Contrast ratio } [\%] = \frac{Ry_{black}}{Ry_{white}} \times 100\%$$

with $Ry_{black}$ and $Ry_{white}$ being obtained by the measurement of the color values.

EXAMPLES

The following illustrative examples of the invention involve contacting a calcium carbonate containing mineral, namely a ground natural marble according to the process of the present invention in a jacketed steel reactor equipped with a laminar mixing system in a batch size of 10l. The solid content is adjusted to either 10 wt. % or 8 wt. % solids, as indicated in table 1. The addition of the at least one water-soluble acid of step b) and the contacting of said aqueous calcium carbonate containing mineral slurry of step a) with said acid of step b) and with said $CO_2$ generated in situ and/or supplied externally of step d) take place in a stirred reactor under stirring conditions such as to develop an essentially laminar flow.

The marble used in the process of the present invention and indicated as H90 in table 1., is a commercially available product from the applicant sold under the brand name Hydrocarb® 90-ME 78%, which is a natural ground marble from Molde in Norway, having a top cut $d_{98}$ of 5 μm, and weight median particle size $d_{50}$ of 0.7 μm (size determined by Sedigraph), and provided in form of a slurry with solids content of 78 wt. % based on dry matter of the slurry and a viscosity of 400 mPas.

The mixing speed is adjusted to either 140 or 300 rpm, and the temperature is adjusted to 70° C. Prior to the dosing of a 30 wt. % of phosphoric acid solution, which is added over a period of 10 or 30 min, the processing agent aluminum sulfate hexadecahydrate was added at once to the calcium carbonate containing mineral slurry in amounts of 0.5 wt. % or 0.6 wt. %. The reaction was mixed at the indicated mixing speeds and times according to table 1.

TABLE 1

| | Tank Conditions | | | | $H_3PO_4$ 30 wt. % | | $Al_2(SO_4)_3*16H_2O$ | |
|---|---|---|---|---|---|---|---|---|
| | Target | | | | Added | | | |
| | Batch Size (l) | Mixing Speed (rpm) | Slurry Solids wt. % | Feed Slurry Type | Temp. °C. | dosing of wt. % | over a period of | Final conc. wt. % | Addition time |
| E1 | 10.00 | 300 | 10.0 | H90 | 70 | 30.0 | 10 min | 0.5 | b/a |
| E2 | 10.00 | 300 | 8.0 | H90 | 70 | 30.0 | 10 min | 0.5 | b/a |
| E3 | 10.00 | 300 | 10.0 | H90 | 70 | 30.0 | 10 min | 0.6 | b/a |
| E4 | 10.00 | 140 | 10.0 | H90 | 70 | 30.0 | 10 min | 0.5 | b/a |
| E5 | 10.00 | 140 | 8.0 | H90 | 70 | 30.0 | 10 min | 0.5 | b/a |
| E6 | 10.00 | 140 | 10.0 | H90 | 70 | 30.0 | 30 min | 0.5 | b/a |
| E7 | 10.00 | 140 | 10.0 | H90 | 70 | 30.0 | 10 min | 0.6 | b/a | b/a means addition before acid

The particle size distribution (PSD) of examples E1 to E7 were measured on a Malvern Mastersizer and the particle size distribution curves are shown in FIG. 1. Table 2 provides for the BET specific surface area SSA, the top cut $d_{98}$ and the median grain diameter $d_{50}$ for the examples E1 to E/.

TABLE 2

| | | E1 | E1 | E3 | E4 | E5 | E6 | E7 |
|---|---|---|---|---|---|---|---|---|
| SSA | m²/g | 53.9 | 62.5 | 56.7 | 62.2 | 56.9 | 57.8 | 59.6 |
| $d_{50}$* | μm | 19.7 | 27.9 | 18.9 | 34.5 | 30.4 | 15.3 | 22.8 |
| $d_{98}$* | μm | 41.6 | 46.6 | 38.3 | 57.8 | 50.7 | 27.3 | 39.3 |
| $d_{98}/d_{50}$ | | 2.1 | 1.7 | 2.1 | 1.7 | 1.7 | 1.8 | 1.7 |

*determined by Malvern Mastersizer

The examples E2, E6, and E7 of surface modified calcium carbonates were tested in paints. For this, E2, E6 and E7 were mixed in formulations and compared with matting agents used in this area such as diatomaceous earths (C1, C3) or aluminum silicate (C2). The dosage level of all matting agents was at 3wt. %. Said formulations further comprise common additives such as defoamers, dispersing agents, sodium hydroxide, fungicides, bactericides, titanium dioxide (rutile), talcum, fillers, pigments, thickeners, plasticizer, viscosity modifiers, water, and others known to the skilled person. Table 3 provides for the composition of the test paint.

TABLE 3

| Base test paint | | C1 | C2 | C3 | P2 | P6 | P7 |
|---|---|---|---|---|---|---|---|
| Water | g | 331 | 331 | 331 | 331 | 331 | 331 |
| Calgon N neu | g | 1 | 1 | 1 | 1 | 1 | 1 |
| Bermocoll EHM 200 | g | 3 | 3 | 3 | 3 | 3 | 3 |
| Sodium hydroxide, 10% | g | 2 | 2 | 2 | 2 | 2 | 2 |
| BYK 038 | g | 3 | 3 | 3 | 3 | 3 | 3 |
| ECODIS P 50 | g | 3 | 3 | 3 | 3 | 3 | 3 |
| Mergal 723K | g | 2 | 2 | 2 | 2 | 2 | 2 |
| Tiona 595 | g | 60 | 60 | 60 | 60 | 60 | 60 |
| Finntalc M20SL - AW | g | 80 | 80 | 80 | 80 | 80 | 80 |
| Omyacarb EXTRA - CL | g | 150 | 150 | 150 | 150 | 150 | 150 |
| Omyacarb 2 - GU | g | 220 | 220 | 220 | 220 | 220 | 220 |
| Mowilith LDM 6119, 50% | g | 115 | 115 | 115 | 115 | 115 | 115 |
| Matting agents | | | | | | | |
| Celite 281 (Diatomaceous Earth) | g | 30 | | | | | |
| OpTiMat 2550 (Aluminum Silicate) | g | | 30 | | | | |
| Celatom MW 27 (Diatomaceous Earth) | g | | | 30 | | | |
| E2 | g | | | | 30 | | |
| E6 | g | | | | | 30 | |
| E7 | g | | | | | | 30 |
| COAPUR 4435* (Polyurethan thickener) | g | 10 | 10 | 10 | 10 | 10 | 10 |
| Total | g | 1 010 | 1 010 | 1 010 | 1 010 | 1 010 | 1 010 |

*the 1% of COAPUR 4435 was added after the paint production to raise the viscosity to an applicable level.

The fillers and pigments were replaced on a volume basis, i.e. at identical Pigment Volume Concentration (PVC). The paints were tested for dry opacity (ISO 2814), whiteness Ry (DIN 53145) and sheen (DIN67530) (gloss at)85°. The components and functions of the materials for the base test paint are commercially available products known to the skilled person and listed in table 4 hereto below.

TABLE 4

Material for base paint.

| | Producer | Chemical basis | Function |
|---|---|---|---|
| Base test paint | | | |
| Water | In house, deionized | $H_2O$ | Solvent |
| Calgon N new | BK Giulini Chemie | Sodium polyphosphate | Wetting and dispersing agent |
| Bermocoll EHM 200 | AkzoNobel Corp. | Ethyl Hydroxyethyl cellulose | Thickener |
| Sodium hydroxide, 10% | Various | NaOH solution | pH regulator |
| BYK 038 | Byk Chemie | Mineral oil basis | Defoamer |
| ECODIS P 50 | Coatex SA | Sodium salt of acrylic polymer | Wetting and dispersing agent |
| Mergal 723K | Troy Chemie GmbH | Benzisothiazolone basis, without formaldehyde | Preservative |
| Tiona 595 | Millenium Inorganic Chemials | Titanium dioxide, rutile (Al, org. coated) | White pigment |
| Finntalc M20SL - AW | Mondo Minerals | Magnesium Silicate | Extender |
| Omyacarb EXTRA - CL | Omya Clariana SA | Calcium carbonate, marble | Extender |
| Omyacarb 2 - GU | Omya | Calcium carboanate, marble | Extender |
| Mowilith LDM 6119, 50% | Clariant | non-plasticized aqueous polymer dispersion based on styrene and an acrylic acid ester | Binder (copolymer) |
| Matting agents | | | |
| Celite 281 (Diatomaceous Earth) | Celite France | Diatomaceous Earth (silica) | Matting agent |
| OpTiMat 2550 | Imerys | Aluminum silicate | Matting agent |
| Celatom MW 27 | EP Minerals | Diatomaceous Earth | Matting agent |
| E2 | Omya | Surface modified marble | Matting agent |
| E6 | Omya | Surface modified marble | Matting agent |
| Paint thickener | Various Producers | Polyurethane | Thickener |

The performance of the tested paints is summarized in table 5, wherein C1, C2, and C3 refer to comparative paint examples and P2, P6, and P7 refer to the paint examples comprising the surface modified calcium carbonate containing minerals obtained by the process of the present invention.

TABLE 5

Performance of paints

| | | C1 | C2 | C3 | P2 | P6 | P7 |
|---|---|---|---|---|---|---|---|
| Temperature | ° C. | 23 | 23 | 23 | 23 | 23 | 23 |
| ICI Viscosity | | 180 | 170 | 160 | 200 | 200 | 200 |
| Paar Physica Viscosity | | | | | | | |
| Viscosity, $\gamma = 1\ s^{-1}$ | Pas | 16 800 | 19 000 | 18 700 | 22 500 | 24 100 | 24 600 |
| Viscosity, $\gamma = 5\ s^{-1}$ | Pas | 6 450 | 7 130 | 7 010 | 8 940 | 9 680 | 9 240 |
| Viscosity, $\gamma = 10\ s^{-1}$ | Pas | 4 380 | 4 790 | 4 700 | 6 150 | 6 640 | 6 190 |
| Viscosity, $\gamma = 40\ s^{-1}$ | Pas | 2 080 | 2 270 | 2 160 | 2 860 | 3 60 | 2 710 |
| Optical properties 150 micrometer, 300 micrometers and 7.5 m²/l | | | | | | | |
| 150 micrometer | | | | | | | |
| Ry | % | 90.4 | 89.8 | 90.2 | 90.9 | 91.0 | 91.1 |
| Ry over black | % | 87.9 | 87.4 | 88.0 | 89.1 | 89.1 | 89.4 |
| Yellowness Index | | 2.5 | 2.6 | 2.5 | 2.0 | 2.0 | 2.1 |
| Contrast Ratio | % | 97.2 | 97.4 | 97.5 | 98.0 | 98.0 | 98.2 |
| Gloss 85° | | 4.9 | 2.9 | 3.9 | 3.6 | 5.6 | 3.6 |
| 300 micrometer | | | | | | | |
| Ry | % | 90.9 | 90.2 | 90.8 | 91.6 | 91.7 | 91.8 |
| Ry over black | % | 90.3 | 89.7 | 90.3 | 91.2 | 91.3 | 91.3 |
| Yellowness Index | | 2.7 | 2.8 | 2.7 | 2.3 | 2.3 | 2.4 |
| Contrast Ratio | % | 99.3 | 99.4 | 99.4 | 99.5 | 99.5 | 99.5 |
| Gloss 85° | | 5.0 | 3.3 | 4.5 | 4.4 | 6.2 | 4.1 |
| Opacity at 7.5 m²/l | | | | | | | |
| Contrast ratio | % | 98.1 | 98.1 | 98.1 | 98.8 | 98.8 | 98.9 |
| Polishing CROWN 300μ | | | | | | | |
| Gloss 60° unscrub | | 2.7 | 2.6 | 2.6 | 2.7 | 2.7 | 2.7 |
| Gloss 60° scrub | | 5.7 | 5.9 | 5.6 | 6.6 | 6.5 | 6.5 |
| Gloss 85° unscrub | | 5.4 | 3.1 | 4.6 | 4.2 | 6.2 | 4.2 |
| Gloss 85° scrub | | 29.5 | 18.7 | 27.1 | 31.7 | 36.3 | 29.5 |

As can be seen from the results of table 4, the examples of the present invention show a performance in matting effect similar to matting agents of the prior art. Such matting effects have up to now not been observed for paints comprising the surface modified calcium carbonate containing minerals having a median grain diameter from about 10 μm to about 50 μm, and having a BET specific surface area from about 30 m$^2$/g to about 90 m$^2$/g of the present invention. The paint properties were measured for dry opacity at 150 μm and 300 μm film thickness, and the contrast ratio was determined at 7.5 m$^2$/l. P2, P6, and P7 provide for a gloss at 85° of 4.1, 6.2, and 4.1 at a coating thickness of 300 μm. This is also in expectation of the matting effect to decrease with decreasing particle size.

Therefore, the present invention provides for alternative matting agents based on calcium carbonate containing mineral, providing a matting effect when used in paints and/or coatings, while at the same time providing a haptic smooth surface. Further to this, the present invention provides for a process for obtaining such surface modified calcium carbonate containing minerals, wherein said surface modified calcium carbonate containing minerals can be used in paper and paper coating, tissue paper, digital photo paper, paints, coatings, adhesives, plastics, or in waste water treating agents.

The invention claimed is:

1. A product obtained by a process for producing ball-shaped spherical surface modified calcium carbonate comprising particles, wherein the process comprises the steps of:
   a) providing at least one aqueous calcium carbonate containing mineral slurry;
   b) providing at least one water-soluble acid;
   c) providing gaseous $CO_2$ generated in situ and/or supplied externally;
   d) contacting the aqueous calcium carbonate containing mineral slurry of step a) with the acid of step b) and with the $CO_2$ of step c) under stirring conditions to obtain ball-shaped spherical surface modified calcium carbonate comprising particles; and
   e) optionally dewatering the aqueous slurry,
   wherein at least one processing agent is added before, during or after the aqueous calcium carbonate containing mineral slurry of step a) is contacted with the acid of step b) and the $CO_2$ of step c), and
   wherein the processing agent is selected from the group consisting of ferrous sulfate, ferric sulfate, ferrous chloride, aluminum sulfate, and their hydrated forms, and
   wherein the processing agent is added in an amount of up to 8 wt. % based on the dry weight of the slurry.

2. The product according to claim 1, wherein the calcium carbonate containing mineral of step a) is selected from the group consisting of marble, chalk, limestone, calcite, dolomite, precipitated calcium carbonate (PCC), and any mixture thereof.

3. The product according to claim 1, wherein the calcium carbonate containing mineral of step a) has a weight median particle diameter of 0.01 μm to 10 μm.

4. The product according to claim 1, wherein the calcium carbonate containing mineral of step a) has a weight median particle diameter of 0.02 μm to 2 μm.

5. The product according to claim 1, wherein the slurry of step a) is stabilized by the addition of one or more dispersants.

6. The product according to claim 1, wherein the at least one water-soluble acid of step b) is phosphoric acid, citric acid, boric acid, or any mixture thereof.

7. The product according to claim 1, wherein the at least one water-soluble acid is dosed in a molar amount relative to the numbers of moles of the calcium carbonate containing mineral in the range from 0.01 mol/mol to 1 mol/mol.

8. The product according to claim 1, wherein the processing agent is added in an amount of from 0.01 wt. % to 5 wt. % based on the dry weight of the slurry.

9. The product according to claim 1, wherein the processing agent is added in an amount of from 0.4 wt. % to 3 wt. % based on the dry weight of the slurry.

10. The product according to claim 1, wherein the processing agent is aluminum sulfate or its hydrate.

11. The product according to claim 1, wherein the processing agent is aluminum sulfate hexadecahydrate.

12. The product according to claim 11, wherein the aluminum sulfate is added up to 5 wt. % based on the weight of the dry slurry.

13. The product according to claim 11, which is in the form of a slurry.

14. The product according to claim 11, which is dried.

15. The product according to claim 1, wherein the surface modified calcium carbonate has a median grain diameter of from 4 μm to about 100 μm.

16. The product according to claim 1, wherein the surface modified calcium carbonate has a median grain diameter of from 10 μm to 50 μm.

17. The product according to claim 1, wherein the surface modified calcium carbonate has a median grain diameter of from 15 μm to 30 μm.

18. The product according to claim 1, wherein the surface modified calcium carbonate has a BET specific surface area of more than 15 m$^2$/g.

19. The product according to claim 1, wherein the surface modified calcium carbonate has a BET specific surface area of 20 m$^2$/g to 200 m$^2$/g.

20. The product according to claim 1, wherein the surface modified calcium carbonate has a BET specific surface area of 30 m$^2$/g to 150 m$^2$/g.

21. The product according to claim 1, wherein the surface modified calcium carbonate has a BET specific surface area of 40 m$^2$/g to 100 m$^2$/g.

22. The product according to claim 1, wherein the surface modified calcium carbonate has a BET specific surface area of 30 m$^2$/g to about 90 m$^2$/g and a median grain diameter from 10 μm to 50 μm.

23. The product according to claim 1, wherein the surface modified calcium carbonate has a particle size distribution $d_{98}/d_{50}$ smaller than 3.

24. The product according to claim 1, wherein the surface modified calcium carbonate has a particle size distribution $d_{98}/d_{50}$ smaller than 2.5.

25. The product according to claim 1, wherein the surface modified calcium carbonate has a particle size distribution $d_{98}/d_{50}$ from 1.4 to 2.9.

26. Paint or coating comprising the product of claim 1 in slurry or dried form.

27. The paint or coating according to claim 26, wherein the surface modified calcium carbonate in slurry or dried form is used as a matting agent in paints and coatings.

28. The paint or coating according to claim 27, wherein the matting agent is present in an amount of 1 to 10 wt. %, based on the wet paint.

29. The paint or coating according to claim 27, wherein the dried paint or coating has a gloss at 85° in the range of below 10, when measured according to DIN 67 530.

30. Paper, tissue paper, digital photo paper, a paint, a coating, an adhesive, a plastic, or waste water treating agent comprising or made with the product according to claim 1 in slurry or dried form.

* * * * *